United States Patent [19]
Matsuda

[11] Patent Number: 5,062,382

[45] Date of Patent: Nov. 5, 1991

[54] FEEDER

[75] Inventor: Takumi Matsuda, Tokyo, Japan

[73] Assignee: Seikosha Co., Ltd., Japan

[21] Appl. No.: 492,636

[22] Filed: Mar. 13, 1990

[30] Foreign Application Priority Data

Mar. 14, 1989 [JP] Japan ............................... 1-28580[U]

[51] Int. Cl.⁵ ............................................. A01K 5/00
[52] U.S. Cl. ............................................... 119/51.04
[58] Field of Search ............... 119/51.11, 51.14, 51.15, 119/51.01, 51.04, 56.1

[56] References Cited

U.S. PATENT DOCUMENTS 4,183,327  1/1980  Olsen ................................ 119/51.11
4,450,790  5/1984  Stansbury, Jr. ................. 119/51.5 X Primary Examiner—Gene Mancene
Assistant Examiner—R. Thomas Price
Attorney, Agent, or Firm—Bruce L. Adams; Van C. Wilks

[57] ABSTRACT

A feeder for dispensing food in a fish tank has a feed box for holding fish food and a rotary drive for rotating the feed box to dispense the food. The feed box comprises a container and a cover. The cover has two opposed elastic arms releasably engageable with the container to detachably couple the cover to the container. The rotary drive has two opposed elastic arms inserted between those of the cover and releasably engageable with the cover to be detachably couple the container to the rotary drive. During detachment of the container from the rotary drive, the arms of the rotary drive restrict disengagement of the arms of the cover from the container thereby preventing accidental detachment of the cover from the container.

15 Claims, 3 Drawing Sheets

FEEDER

BACKGROUND OF THE INVENTION

The applicant has proposed in Utility Model Application No. 77021/1988 an apparatus for periodically supplying feed to goldfish and tropical fish kept in a water tank. This automatic feeder is so designed as to supply a given amount of granular feed in one rotation of a feed box which is periodically rotated by means of a driving apparatus which contains a timer mechanism.

The feed box is detachably connected to a driving shaft of the rotational driving apparatus in a snap fitting method.

It is possible that the feed box comprises a container and a cover which is detachable from the container in a snap fitting method for the purpose of facilitating supply of feed to the feed box. The use of such a feed box in a snap fitting form, however, involves the following problem:

As the feed box must be separated from the rotational driving apparatus in order to supply feed to the feed box, if the feed box is separated from the rotational driving apparatus by holding the container, the cover of the feed box is first separated from the container, resulting in the occurrence of an accident in that the feed remaining in the container scatters.

SUMMARY OF THE INVENTION

Accordingly, it is an object of the present invention to enable the whole of the feed box to be separated from the rotational driving apparatus without any hindrance even if a snap fitting method is used in the feed box itself.

The present invention is characterized in that the coupling structure between a container of a feed box and a cover thereof comprises engagement in a snap fitting manner of two elastic engagement arms integrally formed on the cover with engagement portions formed in the inner walls of an engagement hole of the container, the two elastic engagement arms are formed at the end of the driving shaft projecting from the rotational driving apparatus and are inserted into the gap between the elastic engagement arms of the cover, as well as being engaged in a snap fitting manner with the engagement portions formed on the inner walls of the engagement hole of the feed box in such a manner that any inward deformation of the elastic engagement arms of the cover is inhibited.

When the feed box is separated from the rotational driving apparatus, since the elastic engagement arms of the driving shaft are placed in the ga between the elastic engagement arms of the cover, the elastic engagement arms of the cover are inhibited from being inwardly deformed. The container of the feed box cannot therefore be separated from the cover unless the elastic engagement arms of the rotational driving apparatus are separated from the engagement portions in the engagement hole. FIG. 1 is a partially cut-away view of a feed box used in a feeder according to the present invention;

DETAILED DESCRIPTION OF PREFERRED EMBODIMENT

An embodiment of the present device is described in detail below with reference to the drawings.

Figure 1:
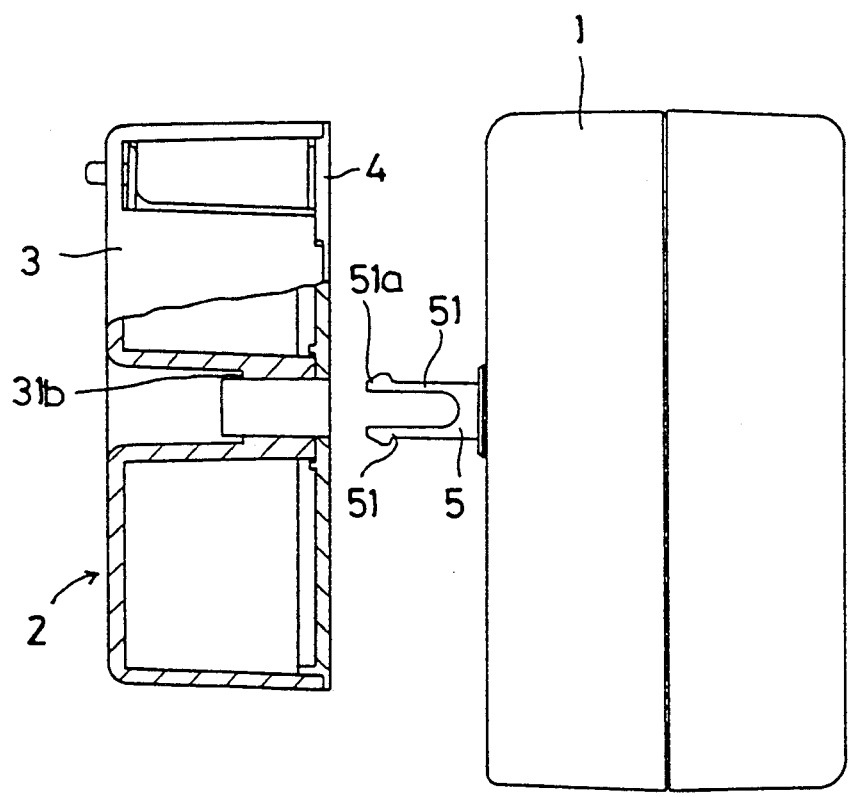

In FIG. 1, a feed box 2 is detachably connected to the rear side of a rotational driving apparatus 1 which contains a timer set mechanism operated at predetermined times. The feed box 2 is designed so as to be periodically rotated by the driving apparatus 1.

Figure 2:
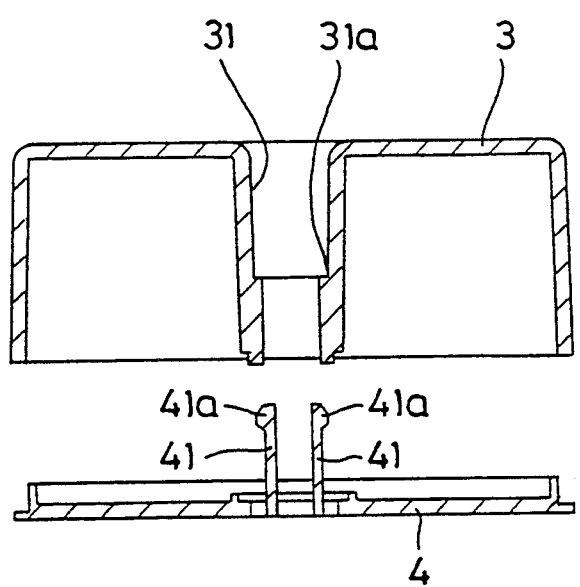
FIG. 2 is a sectional view of the feed box.
Figure 3:
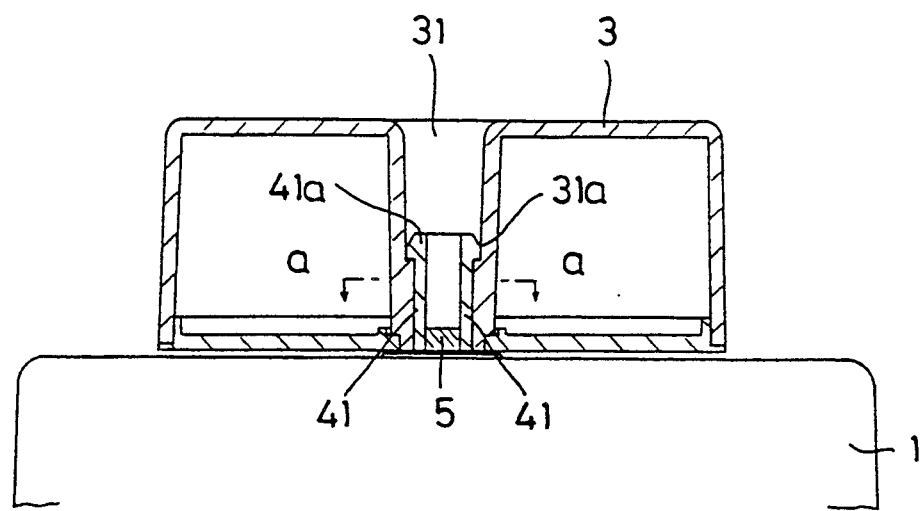
FIG. 3 is a sectional view of a principal portion of the feed box and cover.

The feed box 2 comprises a container 3 and a cover 4 which is detachably coupled with the container in a snap fitting method As shown in FIG. 2, a typical structure of coupling between the container 3 of the feed box 2 and the cover 4 thereof comprises engagement in a snap fitting manner between stepped engagement portions 31a which are integrally formed in the inner walls of an engagement hole 31 formed at the center of the container 3 and engagement claws 41a, 41a formed at the ends of two elastic engagement arms 41, 41 integrally formed on the cover 4.

A description will now be given of the coupling structure between the rotational driving apparatus 1 and the feed box 2 with reference to FIGS. 1-4.

A driving shaft 5 projects rearwardly from the frame body of the rotational driving apparatus 1 and rotates while interlocking with a rotational driving wheel (not shown) which is equipped in the rotational driving apparatus. Two elastic engagement arms 51, 51 are formed at the end of the driving shaft 5. Engagement claws 51a, 51a are respectively outwardly projected from the ends of the engagement arms 51, 51 so as to be able to engage in a snap fitting manner with stepped engagement portions 31b formed at an angle of 90 degrees shifted with respect to the stepped engagement portions 31a in the inner walls of the engagement hole 31 of the feed box 2.

Figure 4:
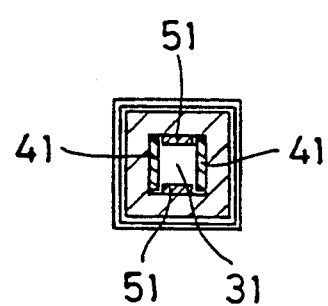
FIG. 4 is a sectional view taken along the line a—a in FIG. 3.

The positional relationship between the elastic engagement arms 51, 51 of the rotational driving apparatus 1 and the elastic engagement arms 41, 41 of the feed box 2 in the engagement hole 31 is shown in FIG. 4. The elastic engagement arms 51, 51 are inserted into the gap between the elastic engagement arms 41, 41 which are thus inhibited from being inwardly deformed by the elastic engagement arms 51, 51.

When the feed box 2 is separated from the rotational driving apparatus 1, therefore, the engagement arms 41, 41 of the cover 4 are inhibited from being inwardly deformed because the elastic engagement arms 51, 51 of the driving shaft 5 are inserted into the gap between the elastic engagement arms 41, 41 even if the feed box 2 is separated from the driving apparatus by holding the container 3. Thus, the elastic engagement arms 51, 51 of the driving shaft 5 of the rotational driving apparatus 1 are first separated from the engagement portions 31b in the engagement hole 31. After the feed box 2 has been separated from the rotational driving apparatus 1, the elastic engagement arms 41, 41 of the cover 4 are easily deformed inward and the container is separated from the cover 4 when the container 3 of the feed box 2 and the cover 4 thereof are held by the hands and then pulled in the opposite directions to each other.

The present invention configured as described above enables the whole of the feed box to be separated without any hindrance, and then the container of the feed box can be separated from the cover thereof when the feed box is separated from the rotational driving apparatus for the purpose of supplying feed.

I claim:

1. A feeder having a rotational driving apparatus and a feed box detachably connected to said rotational driving apparatus and rotationally driven by said driving apparatus, the improvement comprising:
   said feed box comprises a container, and a cover detachably coupled to said container by a snap fitting method;
   coupling means for detachably coupling said container and said cover with a snap fit, said coupling means comprising engagement portions defined by inner walls of an engagement hole of said container and two elastic engagement arms integrally formed on said cover;
   two elastic engagement arms at an end of a driving shaft projecting from said rotational driving apparatus; and wherein said elastic engagement arms of said driving apparatus are inserted with a snap fit into said elastic engagement arms of said cover and engage with said engagement portions on the inner walls of said engagement hole of said feed box in such a manner to inhibit inward deformation of said elastic engagement arms of said cover.

2. A feeder for dispensing food, comprising: a displaceable feed box comprised of a container for holding food to be dispensed and a cover detachably connected to the container; first coupling means for detachably coupling the cover to the container, the coupling means comprising spaced-apart elastic arms connected to the cover and detachably engageable with the container; driving means for displacing the container to dispense therefrom the food; and second coupling means for detachably coupling the container to the driving means to enable detachment of the container from the driving means, the second coupling means comprising spaced-apart elastic arms connected to the driving means and detachably engageable with the container to enable detachment of the container from the driving means without effecting detachment of the cover from the container.

3. A feeder according to claim 2; wherein the container has first engaging portions releasably engageably with the elastic arms of the cover, and second engaging portions releasably engageable with the elastic arms of the driving means.

4. A feeder according to claim 3; wherein the cover has an opening therein defined by a wall portion of the cover, the wall portion being comprised of the first and second engaging portions.

5. A feeder according to claim 4; wherein the elastic arms of the cover comprise two elastic arms disposed in opposed spaced-apart relation to each other, and the elastic arms of the driving means comprise two elastic arms disposed in opposed spaced-apart relation to each other and inserted in the space between the spaced-apart elastic arms of the cover to restrict disengagement thereof from the first engaging portions of the container during detachment of the container from the driving means.

6. A feeder according to claim 5; wherein the opening in the container has a generally square cross section.

7. A feeder according to claim 3; wherein the elastic arms of the cover comprise two elastic arms disposed in opposed spaced-apart relation to each other, and the elastic arms of the driving means comprise two elastic arms disposed in opposed spaced-apart relation to each other and inserted in the space between the spaced-apart elastic arms of the cover to restrict disengagement thereof from the first engaging portions of the container during detachment of the container from the driving means.

8. A feeder according to claim 7; wherein the first and second engaging portions comprise a stepped wall portion of the container.

9. A feeder according to claim 7; wherein the elastic arms of the cover and driving means releasably engage with the respective engaging portions of the cover with a snap fit.

10. A feeder according to claim 7; wherein the cover and the elastic arms connected thereto comprise an integral one-piece structure.

11. A feeder according to claim 10; wherein the driving means and the elastic arms connected thereto comprise an integral one-piece structure.

12. A feeder according to claim 2; wherein the driving means and the elastic arms connected thereto comprise an integral one-piece structure.

13. A feeder according to claim 2; wherein the cover and the elastic arms connected thereto comprise an integral one-piece structure.

14. A feeder according to claim 2; wherein the driving means and the elastic arms connected thereto comprise an integral one-piece structure.

15. A feeder according to claim 2; wherein the driving means comprises means for rotationally displacing the container.

* * * * *